(12) United States Patent
Beck et al.

(10) Patent No.: US 9,850,984 B2
(45) Date of Patent: Dec. 26, 2017

(54) MULTI-SPEED TRANSMISSION IN PLANETARY DESIGN

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/769,618

(22) PCT Filed: Jan. 22, 2014

(86) PCT No.: PCT/EP2014/051163
§ 371 (c)(1),
(2) Date: Aug. 21, 2015

(87) PCT Pub. No.: WO2014/127941
PCT Pub. Date: Aug. 28, 2014

(65) Prior Publication Data
US 2016/0033013 A1    Feb. 4, 2016

(30) Foreign Application Priority Data

Feb. 22, 2013   (DE) .................. 10 2013 202 894

(51) Int. Cl.
*F16H 3/66*      (2006.01)
*F16H 3/44*      (2006.01)

(52) U.S. Cl.
CPC .......... *F16H 3/66* (2013.01); *F16H 2003/445* (2013.01); *F16H 2200/0065* (2013.01); *F16H 2200/201* (2013.01); *F16H 2200/2046* (2013.01)

(58) Field of Classification Search
None
See application file for complete search history.

(56) References Cited

U.S. PATENT DOCUMENTS 3,946,623 A * 3/1976 Murakami .............. F16H 3/666
475/276
6,267,703 B1  7/2001 Park
(Continued)

FOREIGN PATENT DOCUMENTS

| JP | 2011-017424 | 1/2011 |
| JP | 2012-127398 | 7/2012 |
| JP | 2012-127399 | 7/2012 |

OTHER PUBLICATIONS

PCT Search Report and Written Opinion, dated May 8, 2014.

*Primary Examiner* — Erin D Bishop
(74) *Attorney, Agent, or Firm* — Dority & Manning, P.A.

(57) ABSTRACT

A multi-speed transmission in planetary design for a vehicle includes a housing, a first shaft (1) as a drive (An), and a second shaft (2) provided as an output (Ab) that is arranged in a manner axially parallel to the drive. Three planetary gear sets, additional shafts, along with six shifting elements are also provided, through which the actuation of several gears are realized. Machine elements are provided for the transfer of torque between the drive and the output. The first shaft is connectable to the planetary gear carrier of the second planetary gear set, to the sun gear of the first planetary gear set, to the ring gear of the second planetary gear set, to the planetary gear carrier of the first planetary gear set, and to the first spur gear stage. The second shaft is connected or connectable to the first machine element and to the second machine element.

16 Claims, 5 Drawing Sheets

(56) References Cited

U.S. PATENT DOCUMENTS

| | | | |
|---|---|---|---|
| 7,198,586 B2* | 4/2007 | Brooks | F16H 3/66 475/276 |
| 7,819,772 B2 | 10/2010 | Tenberge | |
| 2006/0166780 A1* | 7/2006 | Raghavan | F16H 3/66 475/296 |
| 2009/0098974 A1 | 4/2009 | Phillips | |
| 2009/0192012 A1* | 7/2009 | Phillips | F16H 3/66 475/284 |
| 2010/0035718 A1 | 2/2010 | Saitoh | |
| 2010/0311534 A1 | 12/2010 | Sugino | |

* cited by examiner

| Gang (gear) | geschlossene Schaltelemente (engaged shifting elements) ||||||  Über-setzung (ratio) | Gang-sprung (step) |
|---|---|---|---|---|---|---|---|---|
| | Bremse (brake) || Kupplung (clutch) |||| i | φ |
| | B1 | B2 | K1 | K2 | K3 | K4 | | |
| G1 | X | | | X | | X | 3,867 | |
| G2 | X | | X | | | X | 2,499 | 1,548 |
| G3 | | | X | X | | X | 1,743 | 1,434 |
| G4 | | | | X | X | X | 1,345 | 1,296 |
| G5 | | | X | X | X | | 1,000 | 1,345 |
| G6 | X | | X | | X | | 0,792 | 1,262 |
| G7 | X | | | X | X | | 0,677 | 1,170 |
| G8 | X | X | | | X | | 0,536 | 1,265 |
| G9 | | X | | X | X | | 0,426 | 1,256 |
| R | | X | X | | | X | -3,157 | Gesamt (total) 9,069 |
| M1 | | X | | | X | X | 1,345 ||
| M2 | | | X | | X | X | 1,345 ||
| M3 | X | | | | X | X | 1,345 ||

Fig. 3

MULTI-SPEED TRANSMISSION IN PLANETARY DESIGN

FIELD OF THE INVENTION

The present invention relates to a multi-speed transmission in planetary design for a vehicle, wherein the transmission includes a first shaft is provided as a drive and a second shaft provided as an output that is arranged in a manner axially parallel to the drive, three planetary gear sets and additional shafts along with six shifting elements.

BACKGROUND OF THE INVENTION

As an example, publication DE 10 2007 014 150 A1 discloses a load-shiftable multi-speed transmission. With this multi-speed transmission, the drive shaft is firmly connected through a torsional vibration damper to a first shaft of a first shaft train. A second shaft train arranged parallel to this includes, among other things, the two output shafts designated as shafts. The two shaft trains are connected to each other through three spur gear stages. A first three-shaft planetary gear stage is located on the first shaft train. A second planetary gear stage and a third planetary gear stage are located on the second shaft train. Thus, the multi-speed transmission comprises ten shafts that are connected to each other through three spur gear stages and three planetary gear stages. For shifting the eight forward gears and one reverse gear, five shifting elements are necessary. The provided shifting elements are hydraulically operated.

In order to reduce hydraulic losses, the shifting elements are to be arranged in a manner that is easily accessible from the outside. However, with a front-transverse installation of the transmission in a vehicle, only a limited axial installation space is available.

SUMMARY OF THE INVENTION

The present invention is subject to a task of providing a multi-speed transmission with the highest possible number of gears and easy accessibility of the shifting elements, with, at the same time, a good gearing efficiency and a need for axial installation space that is as low as possible. Additional objects and advantages of the invention will be set forth in part in the following description, or may be obvious from the description, or may be learned through practice of the invention.

The tasks are solved by the characteristics of the transmission embodiments described and claimed herein.

Accordingly, a load-shiftable multi-speed transmission in planetary design, or a multiple-gear planetary transmission for a vehicle with a housing, is proposed, whereas the drive or the drive shaft, as the case may be, and the output or the output shaft, as the case may be, are arranged in a manner axially parallel to each other for a preferred front-transverse installation. The multi-speed transmission in accordance with the invention comprises only nine shafts, three planetary gear sets and only six shifting elements, in order to realize at least nine forward gears and one reverse gear. In addition, for the coupling of the drive and the output, it is preferable that only two machine elements are provided.

Given the fact that the first shaft, as a drive, is detachably connected or connectable to the planetary gear carrier of the second planetary gear set, to the sun gear of the first planetary gear set, to the ring gear of the second planetary gear set, to the planetary gear carrier of the first planetary gear set and to the first spur gear stage, and that the second shaft, as an output, is connected, or is detachably connected or connectable, to the first machine element and to the second machine element, a multi-speed transmission in accordance with the invention that enables an actuation of the shifting elements that improves the degree of efficiency and is thus in line with demand arises. The advantageously low number of transmission elements of the multi-speed transmission for a front-transverse design has its transmission elements nested with each other in such a manner that an arrangement that particularly saves axial installation space is enabled. In addition to the improved degree of efficiency, low component stresses and low construction costs arise.

The easy accessibility of the shifting elements may be realized, among other things, on the one hand through the use of brakes as shifting elements and, on the other hand, through the use of clutches as shifting elements, which are preferentially positioned at outside shafts, preferably at the drive and at the output, with the multi-stage transmission in accordance with the invention. Due to the low construction costs, in an advantageous manner, low production costs and a low weight of the multi-speed transmission in accordance with the invention arise.

Within the framework of a possible embodiment of the invention, it can be provided that, as a machine element for the coupling or for the transfer of torque between the drive and the output, at least one spur gear stage or the like, which realizes the transmission ratio for the output differential, is used. Preferably, only two machine elements or spur gear stages are provided. However, other machine elements for the transmission of torque power, such as chains, belts or the like, may be used.

Viewed in an axial direction, the planetary gear sets are arranged in the order of first planetary gear set, second planetary gear set and third planetary gear set, whereas it is preferable that only negative planetary gear sets are provided. However, at spots where the binding ability allows it, individual or several negative planetary gear sets may be converted into positive planetary gear sets, if, at the same time, the bar connection or planetary gear carrier connection and the ring gear connection are exchanged, and the amount of the stationary transmission ratio is increased by the value of 1. As is well-known, a negative planetary gear set features, at the planetary gear carrier, rotatably mounted planetary gears, which mesh with the sun gear and the ring gear of such planetary gear set, such that, with a planetary gear carrier that is held down and a rotating sun gear, the ring gear rotates in a direction opposite to the direction of rotation of the sun gear. As is well-known, a positive planetary gear set features, at its planetary gear carrier, inner and outer planetary gears that are rotatably mounted and are in a tooth meshing with each other, whereas the sun gear of such planetary gear set meshes with the inner planetary gears, and the ring gear of such planetary gear set meshes with the outer planetary gears, such that, with a planetary gear carrier that is held down and a rotating sun gear, the ring gear rotates in the same direction as the direction of rotation of the sun gear.

With the multi-speed transmission in accordance with the invention, a hydrodynamic torque converter or a hydrodynamic clutch can be used as the start-up element. It is also conceivable that an additional start-up clutch or an integrated start-up clutch or a start-up brake are used. Furthermore, it is possible that an electric machine or any other power source is arranged at at least one of the shafts. Moreover, at at least one of the shafts, a freewheel is arranged for the housing or for another shaft.

Preferably, with the multi-speed transmission in accordance with the invention, nine forward gears and at least one reverse gear can be shifted by means of the provided shifting elements. However, it is conceivable that, preferably for the fourth forward gear and also for other gears, additional shifting combinations are made possible by combining other shifting elements.

The term "shifting element" is understood to mean a shiftable connection between two elements of the transmission, whereas the torque to be transferred between such two elements is transferred by means of the force closure or frictional closure or by means of the form closure. If both elements of the shiftable connection are designed to rotate, the shifting element is referred to as a clutch, and if only one of the two elements of the shiftable connection rotates, the shifting element is referred to as a brake. Moreover, the geometric position and/or order of the individual shifting elements can be freely selected, as long as the binding ability of the elements allows this. In this manner, individual elements may be arbitrarily moved into any position. In addition, to the extent permitted by the external shape, several gear sets can be arranged radially above one another, thus in a nested manner.

Embodiments of a force-fitting shifting element include multi-disk clutches or brakes, band brakes, cone clutches or brakes, electromagnetic clutches, magnetic powder clutches and electro-rheological clutches. Embodiments of a positive-locking shifting element include claw clutches or brakes and tooth clutches.

Thus, in general, both frictional-locking and positive-locking shifting elements may be used as shifting elements. Preferably, given its characteristics, in particular the fourth shifting element designed as a clutch can be designed as a claw shifting element, by which significant consumption advantages can be achieved.

BRIEF DESCRIPTION OF THE DRAWINGS

In the following, the present invention is explained in more detail based on the drawing. The following is shown:

FIG. 3 is a shifting diagram for the various design variants of the multi-speed transmission;

DETAILED DESCRIPTION

Figure 1:
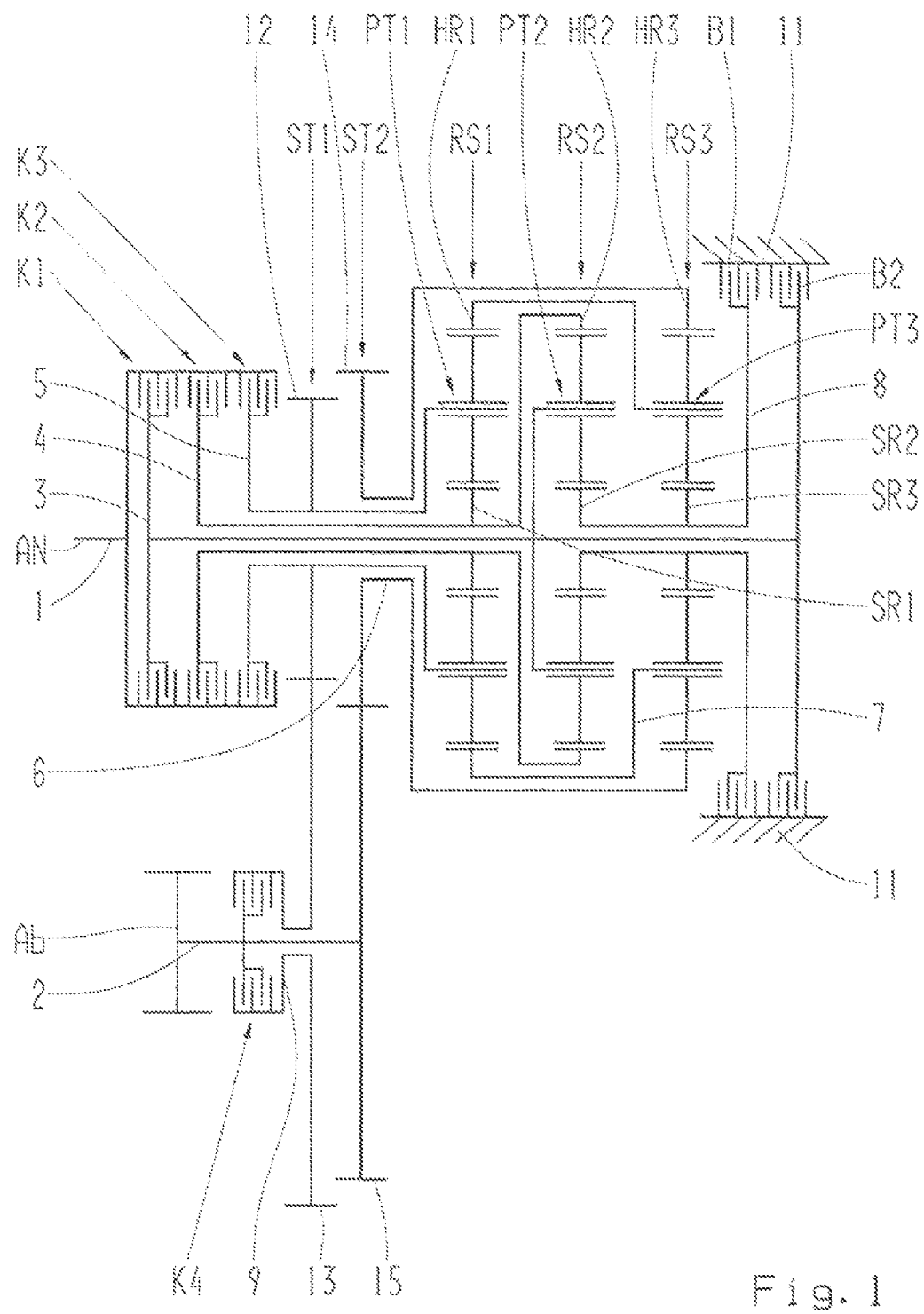
FIG. 1 is a schematic view of a first design variant of a multi-speed transmission in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 2:
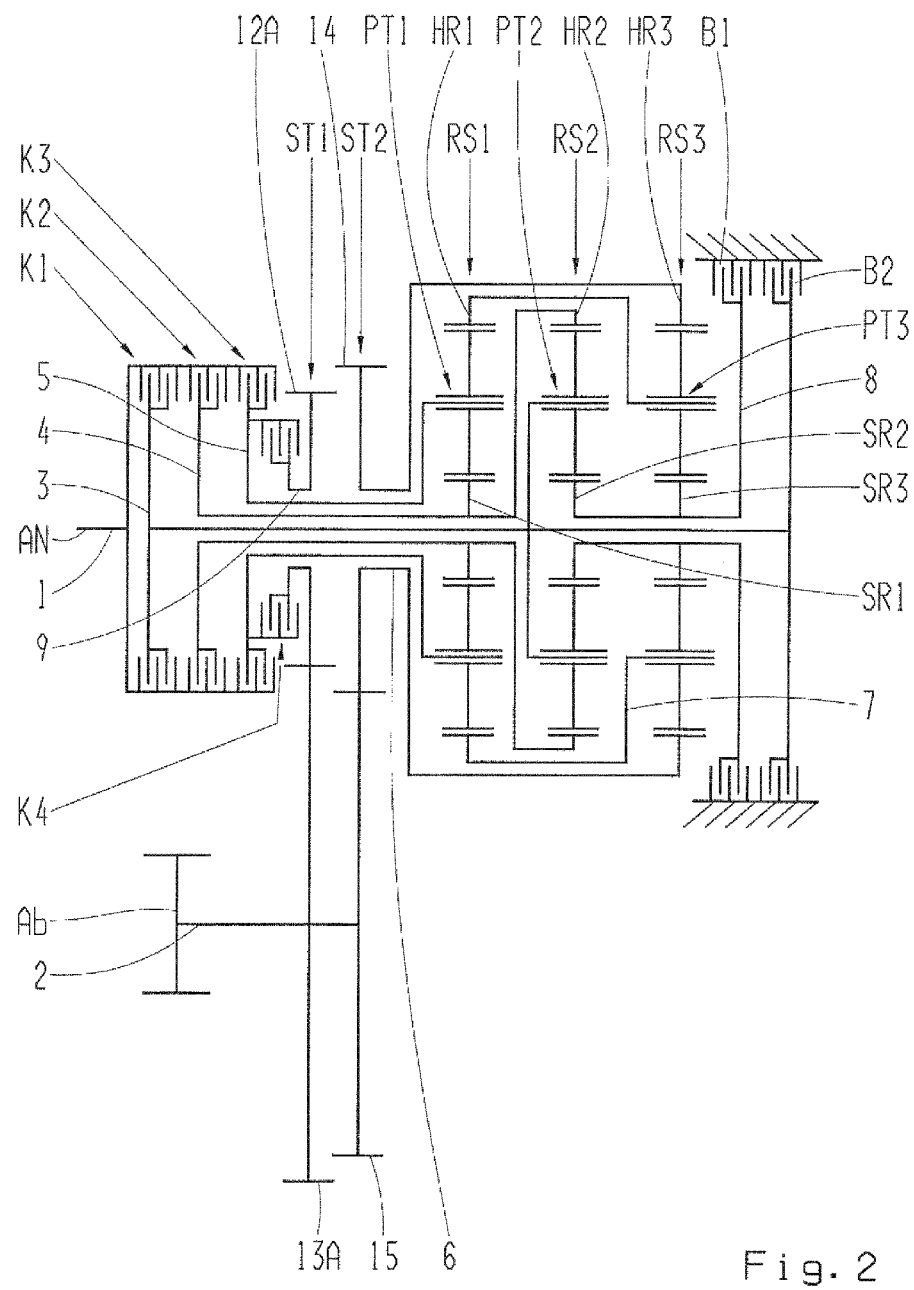
FIG. 2 is a schematic view of a second design variant of the multi-speed transmission.

Each of FIGS. 1 and 2 shows an example of a design variant of the multi-speed transmission in planetary design in accordance with the invention, for example as an automatic gearbox or automatic transmission for a vehicle.

Regardless of the particular design variants, the multi-speed transmission comprises a merely schematically indicated housing 11, with a first shaft 1 as a drive An and a second shaft 2 as an output Ab that is arranged in a manner axially parallel to the drive, along with seven additional shafts 3, 4, 5, 6, 7, 8, 9. Furthermore, a first planetary gear set RS1, a second planetary gear set RS2 and a third planetary gear set RS3 are provided, which are preferably designed as negative planetary gear sets. For shifting several gears, a first shifting element K1 designed as a clutch, a second shifting element K2 designed as a clutch, a third shifting element K3 designed as a clutch, a fourth shifting element K4 designed as a clutch, a fifth shifting element B1 designed as a brake, and a sixth shifting element B2 designed as a brake are provided.

For the coupling or for the transfer of torque between the drive An and the output Ab, two arbitrary machine elements are preferably provided; with the design variants, these are designed, for example, as a first spur gear stage ST1 and a second spur gear stage ST2. With the first design variant in accordance with FIG. 1, the first spur gear stage ST1 comprises a fixed gear 12, which is connected to the fifth shaft 5, and an idler gear 13 meshing with this, which is connected through the ninth shaft 9 and through the fourth shifting element K4 to the second shaft 2. The second spur gear stage ST2 comprises a fixed gear 14, which is connected to the sixth shaft 6, and a fixed gear 15 meshing with this, which is connected to the second shaft 2. In contrast to the first design variant, with the second design variant in accordance with FIG. 2, the first spur gear stage ST1 comprises an idler gear 12A, which is connectable through the ninth shaft 9 and the fourth shifting element K4 designed as a clutch to the fifth shaft 5. The idler gear 12A is meshing with a fixed gear 13A, which is connected to the second shaft 2.

Figure 4:
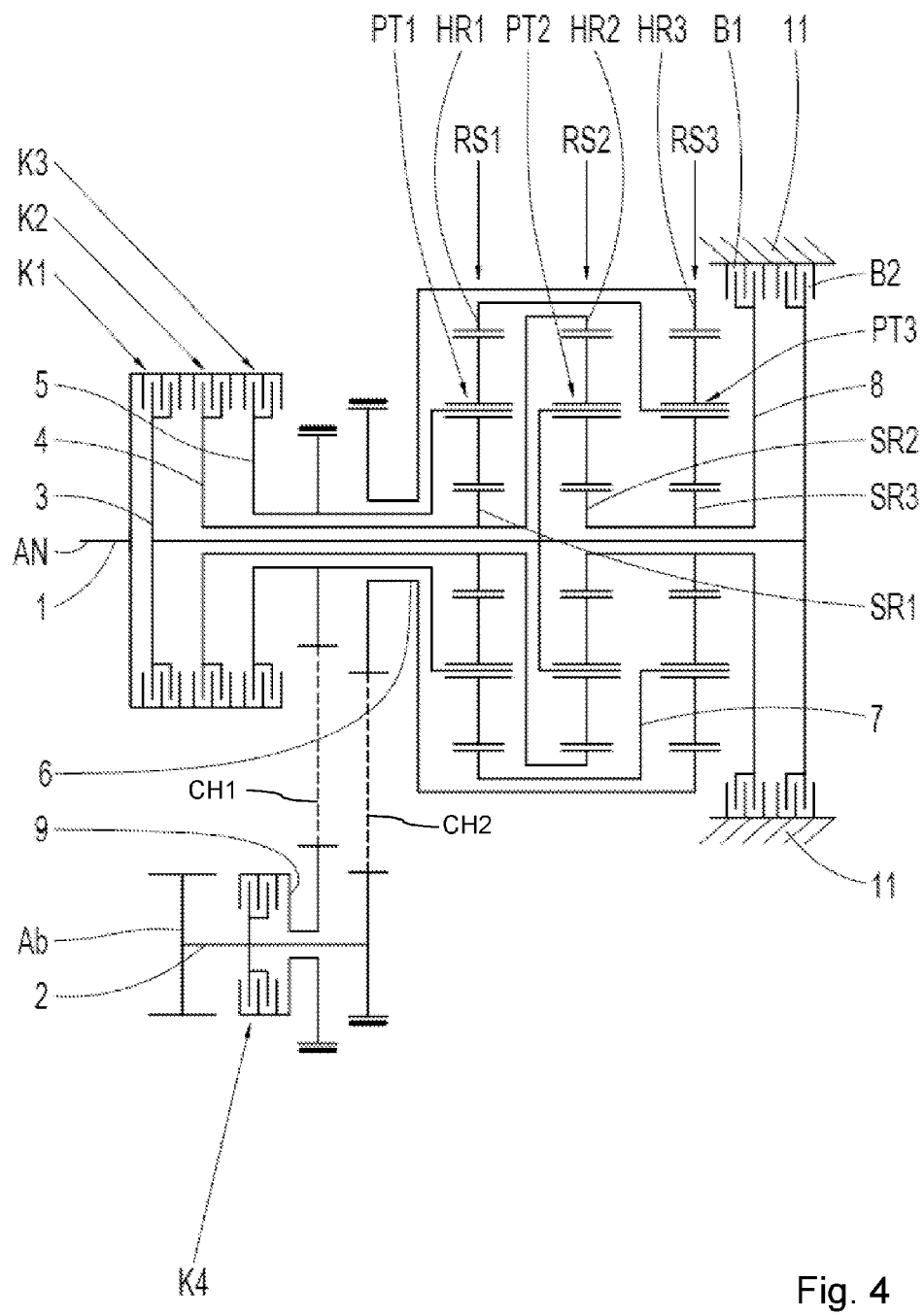
FIG. 4 is a schematic view of the design of FIG. 1 depicting the first and second machine elements as chains.
Figure 5:
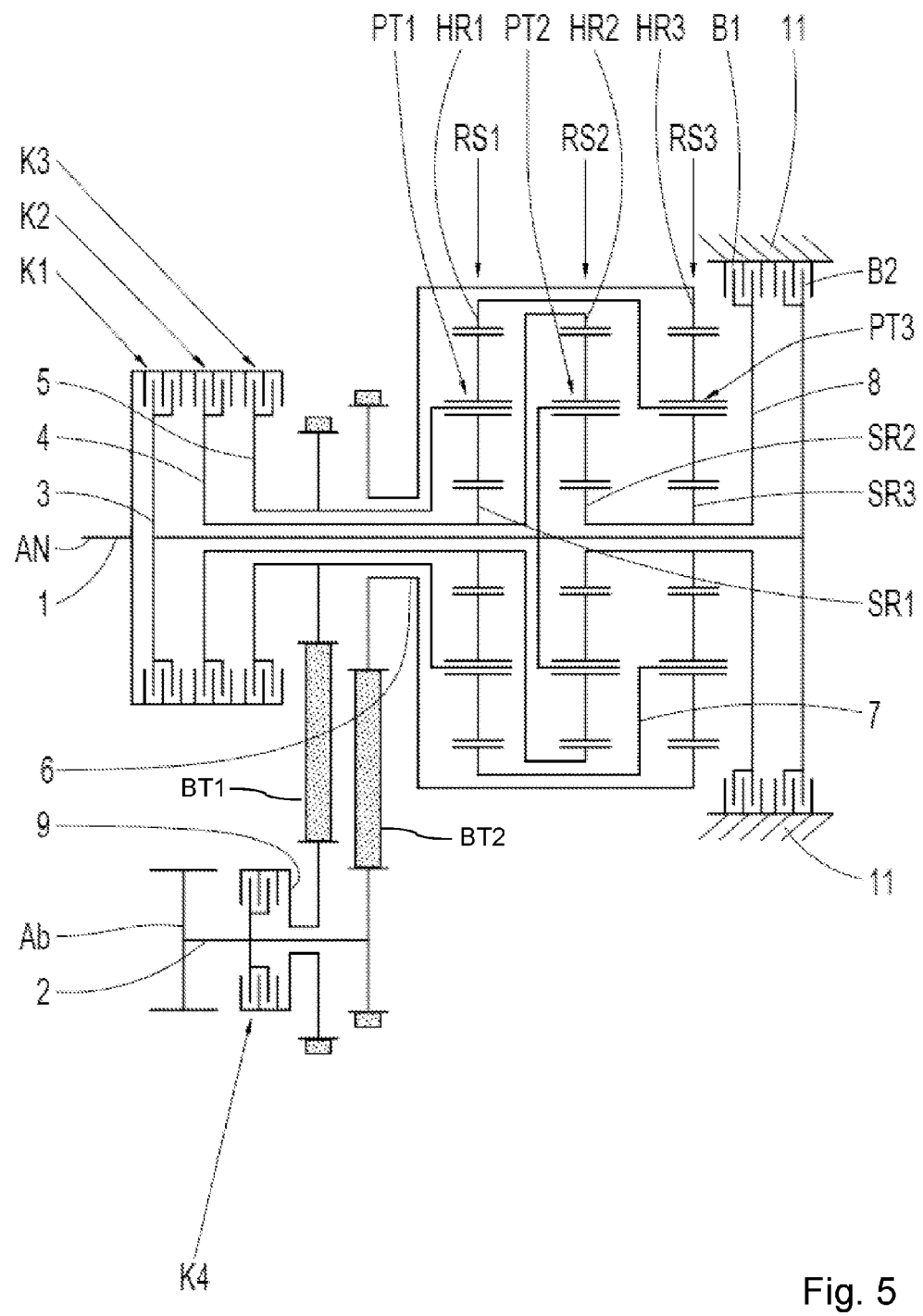
FIG. 5 is a schematic view of the design of FIG. 1 depicting the first and second machine elements as belts.

FIG. 4 depicts an embodiment wherein the machine elements are chains CH1 and CH2. FIG. 5 depicts an embodiment wherein the machine elements are belts BT1 and BT2.

With respect to the connection options between the provided shafts 1, 2, 3, 4, 5, 6, 7, 8, 9, the provided three planetary gear sets RS1, RS2, RS3, the provided housing 11 and the provided shifting elements K1, K2, K3, K4, B1, B2, along with the provided spur gear stages ST1, ST2, with the term "connectable, it is to be understood that the described elements are detachable (for example, connected by a shifting element), such that the connection is locked with an activated shifting element and open with a non-activated shifting element. The detachable connection may be realized through, in addition to the shifting element, an additional element such as a shaft or the like. The term "connected" is understood to mean that the described elements are connected to each other in a manner that is virtually fixed, thus not detachable. A direct or indirect fixed connection (for example, through additional elements) may be realized.

In accordance with the invention, it is provided with the multi-speed transmission that the first shaft 1 is detachably connected or connectable, as drive An, to the planetary gear carrier PT2 of the second planetary gear set RS2. Furthermore, the first shaft 1 is connectable to the sun gear SR1 of the first planetary gear set RS1 and to the ring gear HR2 of the second planetary gear set RS2. Moreover, the first shaft 1 is connectable to the planetary gear carrier PT1 of the first planetary gear set RS1 and the first machine element or the first spur gear stage ST1. Depending on the design variant, the second shaft 2 is connected or connectable, as output Ab, to the first machine element or the first spur gear stage ST1, as the case may be, and the second machine element or the second spur gear stage ST2, as the case may be.

With the first design variant in accordance with FIG. 1, the second shaft 2 is connected to the fixed gear 15 of the second spur gear stage ST2. Furthermore, the second shaft 2 is connectable through the fourth shifting element K4 designed as a clutch and through the ninth gear 9 to the idler gear 13 of the first spur gear stage ST1.

With the second design variant in accordance with FIG. 2, the second shaft 2 is directly connected to the fixed gear 13A of the first spur gear stage ST1 and to the fixed gear 15 of the second spur gear stage ST2. The idler gear 12A of the first spur gear stage ST1 is detachably connected or connectable through the ninth shaft 9 and through the fourth shifting element K4 designed as a clutch, and through the fifth shaft 5 and through the third shifting element K3 designed as a clutch, to the first shaft 1. Furthermore, the first spur gear stage ST1 is connectable through the ninth shaft 9 and through the fourth shifting element K4 designed as a clutch, and through the fifth shaft 5, to the planetary gear carrier PT1 of the first planetary gear set RS1.

With the equally effective transmission variant in accordance with FIG. 2, the fourth shifting element K4 designed as a clutch, which connects the first spur gear stage ST1 to the output shaft or to the second shaft 2, is positioned on the other side of the spur gear, thus on the side of the transmission input shaft or the first shaft 1. For this purpose, the original fixed gear 12 is the idler gear 12A and the original idler gear 13 is the fixed gear 13A.

With the multi-speed transmission in accordance with the invention, regardless of the design variant, the first shaft 1 is connectable through the first shifting element K1 designed as a clutch and through the third shaft 3 to the planetary gear carrier PT2 of the second planetary gear set RS2, whereas the planetary gear carrier PT2 of the second planetary gear set RS2 is connectable through the third shaft 3 and through the sixth shifting element B2 designed as a brake to the housing 11. Furthermore, the first shaft 1 is connectable through the second shifting element K2 designed as a clutch and through the fourth shaft 4 both to the sun gear SR1 of the first planetary gear set RS1 and the ring gear HR2 of the second planetary gear set RS2. The first shaft 1 is connected or connectable through the third shifting element K3 designed as a clutch and through the fifth shaft 5 both to the fixed gear 12 of the first spur gear stage ST1 and the planetary gear carrier PT1 of the first planetary gear set RS1.

Regardless of the particular design variant, the second spur gear stage ST2 is connected through the sixth shaft 6 to the ring gear HR3 of the third planetary gear set RS3. In addition, the ring gear HR1 of the first planetary gear set RS1 is connected through the seventh shaft 7 to the planetary gear carrier PT3 of the third planetary gear set RS3. Moreover, the sun gear SR2 of the second planetary gear set RS2 and the sun gear SR3 of the third planetary gear set RS3 are connectable through the eighth shaft 8 and through the fifth shifting element B1 designed as a brake to the housing 11.

FIG. 3 shows a shifting diagram or a shifting matrix, as the case may be, for the two equally effective transmission variants in accordance with FIGS. 1 to 2. In the shifting diagram, for the realization of the various gears, shifting elements K1, K2, K3, K4, B1, B2 to be locked or activated, as the case may be, are shown in table form, whereas a transmission ratio i is indicated for each gear and the respective gear jump φ is indicated between different gears. In addition to the nine forward gears G1, G2, G3, G4, G5, G6, G7, G8, G9 and the specified reverse gear R, additional shifting combinations are indicated as alternative fourth forward gears M1, M2, M3. As a whole, it also arises from the shifting diagram that the proposed multi-speed transmission features optimized transmission ratio sequences with low absolute and relative rotational speeds and low torques for the planetary gear sets and shifting elements. In addition, good degrees of toothing efficiency and low drag torques arise from the selected arrangements of the gear sets.

As preferred stationary transmission ratios, a value of approximately $i_0 = -3.780$ can be used for the first planetary gear set RS1, a value of approximately $i_0 = -1.825$ can be used for the second planetary gear set RS2, a value of approximately $i_0 = -2.100$ can be used for the third planetary gear set RS3. As the stationary transmission ratio, a value of approximately $i_{ST1} = -1.328$ is selected for the first spur gear stage ST1, and a value of approximately $i_{ST2} = -1.000$ is selected for the second spur gear stage ST2. Moreover, it arises from the shifting diagram that, for shifting gears G1, G2, G3, G4, G5, G6, G7, G8, G9, R, M1 and M2, each of the three shifting elements is locked, whereas, for shifting gear M3, four shifting elements as the alternatives or the fourth gear are locked.

Specifically, it arises from the shifting diagram in accordance with FIG. 3 that, for the realization of the first forward gear G1, the second shifting element K2 designed as a clutch, the fourth shifting element K4 designed as a clutch and the fifth shifting element B1 designed as a brake are locked or activated. For the shifting of the second forward gear G2, the first shifting element K1 designed as a clutch, the fourth shifting element K4 designed as a clutch and the fifth shifting element B1 designed as a brake are locked or activated. For the shifting of the third forward gear G3, the first shifting element K1 designed as a clutch, the second shifting element K2 designed as a clutch and the fourth shifting element K4 designed as a clutch are locked or activated. For the shifting of the fourth forward gear G4, the second shifting element K2 designed as a clutch, the third shifting element K3 designed as a clutch and the fourth shifting element K4 designed as a clutch are locked or activated. For the shifting of the fifth forward gear G5, the first shifting element K1 designed as a clutch, the second shifting element K2 designed as a clutch and the third shifting element K3 designed as a clutch are locked or activated. For the shifting of the sixth forward gear G6, the first shifting element K1 designed as a clutch, the third shifting element K3 designed as a clutch and the fifth shifting element B1 designed as a brake are locked or activated. For the shifting of the seventh forward gear G7, the second shifting element K2 designed as a clutch, the third shifting element K3 designed as a clutch and the fifth shifting element B1 designed as a brake are locked or activated. For the shifting of the eighth forward gear G8, the third shifting element K3 designed as a clutch, the fifth shifting element B1 designed as a brake and the sixth shifting element B2 designed as a brake are locked or activated. For the shifting of the ninth forward gear G9, the second shifting element K2 designed as a clutch, the third shifting element K3 designed as a clutch and the sixth shifting element B2 designed as a brake are locked or activated. Finally, for the shifting of the reverse gear R, the second shifting element K2 designed as a clutch, the fourth shifting element K4 designed as a clutch and the sixth shifting element B2 designed as a brake are locked or activated.

With respect to the shifting combinations of the alternative fourth forward gears M1, M2, M3, it is provided that, for the shifting of the alternative fourth forward gear M1, the third shifting element K3 designed as a clutch, the fourth shifting element K4 designed as a clutch and the sixth shifting element B2 designed as a brake are locked or activated. For the shifting of the alternative fourth forward gear M2, the clutch designed as first shifting element K1, the third shifting element K3 designed as a clutch and the fourth shifting element K4 designed as a clutch are locked or activated. Furthermore, for the shifting of the alternative fourth forward gear M3, the third shifting element K3 designed as a clutch, the fourth shifting element K4 designed as a clutch and the fifth shifting element B1 designed as a brake are locked or activated.

Modifications and variations can be made to the embodiments illustrated or described herein without departing from the scope and spirit of the invention as set forth in the appended claims.

REFERENCE SIGNS

1 First shaft as a drive
2 Second shaft as an output
3 Third shaft
4 Fourth shaft
5 Fifth shaft
6 Sixth shaft
7 Seventh shaft
8 Eighth shaft
9 Ninth shaft
11 Housing
K1 First shifting element as a clutch
K2 Second shifting element as a clutch
K3 Third shifting element as a clutch
K4 Fourth shifting element as a clutch
B1 Fifth shifting element as a brake
B2 Sixth shifting element as a brake
RS1 First planetary gear set
RS2 Second planetary gear set
RS3 Third planetary gear set
SR1 Sun gear of the first planetary gear set
PT1 Planetary gear carrier of the first planetary gear set
HR1 Ring gear of the first planetary gear set
SR2 Sun gear of the second planetary gear set
PT2 Planetary gear carrier of the second planetary gear set
HR2 Ring gear of the second planetary gear set
SR3 Sun gear of the third planetary gear set
PT3 Planetary gear carrier of the third planetary gear set
HR3 Ring gear of the third planetary gear set
ST1 Machine element (first spur gear stage)
ST2 Machine element (second spur gear stage)
12 Fixed gear of the first spur gear stage
12A Idler gear of the first spur gear stage
13 Idler gear of the first spur gear stage
13A Fixed gear of the first spur gear stage
14 Fixed gear of the second spur gear stage
15 Fixed gear of the second spur gear stage
G1 First forward gear
G2 Second forward gear
G3 Third forward gear
G4 Fourth forward gear
G5 Fifth forward gear
G6 Sixth forward gear
G7 Seventh forward gear
G8 Eighth forward gear
G9 Ninth forward gear
R Reverse gear
M1 Alternative fourth gear
M2 Alternative fourth gear
M3 Alternative fourth gear
i Transmission ratio
$i_0$ Stationary transmission ratios of the planetary gear sets
$I_{ST1}$ Stationary transmission ratio of the first spur gear stage
$I_{ST2}$ Stationary transmission ratio of the second spur gear stage
φ Gear jump

The invention claimed is:

1. A multi-speed transmission in planetary design for a vehicle, comprising;
a housing (11);
a first shaft (1) provided as a drive (An), and a second shaft (2) provided as an output (Ab) and arranged axially parallel to the drive (An);
first, second, and third planetary gear sets (RS1, RS2, RS3);
a plurality of additional shafts (3, 4, 5, 6, 7, 8, 9);
six shifting elements (K1, K2, K3, K4, B1, B2), whereby actuation of the six shifting elements realizes several gears;
a first machine element (ST1) and a second machine element (ST2) configured to transfer torque between the drive (An) and the output (Ab), the first and second machine elements each being one of a spur gear stage, a chain, or a belt;
the first shaft (1) connectable as the drive (An) to a planetary gear carrier (PT2) of the second planetary gear set (RS2), to a sun gear (SR1) of the first planetary gear set (RS1), to a ring gear (HR2) of the second planetary gear set (RS2), to a planetary gear carrier (PT1) of the first planetary gear set (RS1), and to the first machine element (ST1); and
the second shaft (2), as the output (Ab), is connected or connectable to the first machine element (ST1) and to the second machine element (ST2);
wherein a ring gear (HR1) of the first planetary gear set (RS1) is directly connected through a seventh shaft (7) of the plurality of additional shafts to a planetary gear carrier (PT3) of the third planetary gear set (RS3); and
wherein the first shaft (1) is connectable through a second shifting element (K2) of the six shifting elements, designed as a clutch, directly to the sun gear (SR1) of the first planetary gear set (RS1) and directly to the ring gear (HR2) of the second planetary gear set (RS2) through a fourth shaft (4) of the plurality of additional shafts.

2. The multi-speed transmission according to claim 1, wherein the first and second machine elements (ST1, ST2) are first and second spur gear stages, respectively.

3. The multi-speed transmission according to claim 2, wherein the first shaft (1) is connectable through a third shifting element (K3) of the six shifting elements, designed as a clutch, and through a fifth shaft (5) of the plurality of additional shafts both to a fixed gear (12) of the first spur gear stage (ST1) and the planetary gear carrier (PT1) of the first planetary gear set (RS1).

4. The multi-speed transmission according to claim 2, wherein the second shaft (2) is connected to a fixed gear (13A) of the first spur gear stage (ST1) and to a fixed gear (15) of the second spur gear stage (ST2), and an idler gear (12A) of the first spur gear stage (ST1) is connectable to the first shaft (1) through a ninth shaft (9) of the plurality of additional shafts, a fourth shifting element (K4) of the six shifting elements, designed as a clutch, a fifth shaft (5) of the plurality of additional shafts, and a third shifting element (K3) of the six shifting elements, designed as a clutch.

5. The multi-speed transmission according to claim 2, wherein a fixed gear (14) of the second spur gear stage (ST2)

is connected through a sixth shaft (6) of the plurality of additional shafts to a ring gear (HR3) of the third planetary gear set (RS3).

6. The multi-speed transmission according to claim 1, wherein the first shaft (1) is connectable through a first shifting element (K1) of the six shifting elements, designed as a clutch, and through a third shaft (3) of the plurality of additional shafts to the planetary gear carrier (PT2) of the second planetary gear set (RS2), whereas the planetary gear carrier (PT2) of the second planetary gear set is connectable to the housing (11) through the third shaft (3) and a sixth shifting element (B2) of the six shifting elements, designed as a brake.

7. The multi-speed transmission according to claim 1, wherein a sun gear (SR2) of the second planetary gear set (RS2) and a sun gear (SR3) of the third planetary gear set (RS3) are connectable to the housing (11) through an eighth shaft (8) of the plurality of additional shafts and a fifth shifting element (B1) of the six shifting elements, designed as a brake.

8. The multi-speed transmission according to claim 1, wherein the six shifting elements (K1, K2, K3, K4, B1, B2) comprise frictional-locking or positive-locking shifting elements.

9. A multi-speed transmission in planetary design for a vehicle, comprising:
   a housing (11);
   a first shaft (1) provided as a drive (An), and a second shaft (2) provided as an output (Ab) and arranged axially parallel to the drive (An);
   first, second, and third planetary gear sets (RS1, RS2, RS3);
   a plurality of additional shafts (3, 4, 5, 6, 7, 8, 9);
   six shifting elements (K1, K2, K3, K4, B1, B2), whereby actuation of the six shifting elements realizes several gears;
   a first machine element (ST1) and a second machine element (ST2) configured to transfer torque between the drive (An) and the output (Ab);
   the first shaft (1) connectable as the drive (An) to a planetary gear carrier (PT2) of the second planetary gear set (RS2), to a sun gear (SR1) of the first planetary gear set (RS1), to a ring gear (HR2) of the second planetary gear set (RS2), to a planetary gear carrier (PT1) of the first planetary gear set (RS1), and to the first machine element (ST1); and
   the second shaft (2), as the output (Ab), is connected or connectable to the first machine element (ST1) and to the second machine element (ST2);
   wherein a ring gear (HR1) of the first planetary gear set (RS1) is directly connected through a seventh shaft (7) of the plurality of additional shafts to a planetary gear carrier (PT3) of the third planetary gear set (RS3);
   wherein the first and second machine elements (ST1, ST2) are first and second spur gear stages, respectively; and
   wherein the second shaft (2) is connected to a fixed gear (15) of the second spur gear stage (ST2), and the second shaft (2) is connectable through a fourth shifting element (K4) of the six shifting elements, designed as a clutch, and through a ninth shaft (9) of the plurality of additional shafts to an idler gear (13) of the first spur gear stage (ST1).

10. A multi-speed transmission in planetary design for a vehicle, comprising:
    a housing (11);
    a first shaft (1) provided as a drive (An), and a second shaft (2) provided as an output (Ab) and arranged axially parallel to the drive (An);
    first, second, and third planetary gear sets (RS1, RS2, RS3);
    a plurality of additional shafts (3, 4, 5, 6, 7, 8, 9);
    six shifting elements (K1, K2, K3, K4, B1, B2), whereby actuation of the six shifting elements realizes several gears;
    a first machine element (ST1) and a second machine element (ST2) configured to transfer torque between the drive (An) and the output (Ab);
    the first shaft (1) connectable as the drive (An) to a planetary gear carrier (PT2) of the second planetary gear set (RS2), to a sun gear (SR1) of the first planetary gear set (RS1), to a ring gear (HR2) of the second planetary gear set (RS2), to a planetary gear carrier (PT1) of the first planetary gear set (RS1), and to the first machine element (ST1);
    the second shaft (2), as the output (Ab), is connected or connectable to the first machine element (ST1) and to the second machine element (ST2);
    wherein a ring gear (HR1) of the first planetary gear set (RS1) is directly connected through a seventh shaft (7) of the plurality of additional shafts to a planetary gear carrier (PT3) of the third planetary gear set (RS3);
    wherein the first and second machine elements (ST1, ST2) are first and second spur gear stages, respectively;
    wherein the second shaft (2) is connected to a fixed gear (13A) of the first spur gear stage (ST1) and to a fixed gear (15) of the second spur gear stage (ST2), and an idler gear (12A) of the first spur gear stage (ST1) is connectable to the first shaft (1) through a ninth shaft (9) of the plurality of additional shafts, a fourth shifting element (K4) of the six shifting elements, designed as a clutch, a fifth shaft (5) of the plurality of additional shafts, and a third shifting element (K3) of the six shifting elements, designed as a clutch; and
    wherein the idler gear (12A) of the first spur gear stage (ST1) is connectable through the ninth shaft (9), the fourth shifting element (K4), and the fifth shaft (5) to the planetary gear carrier (PT1) of the first planetary gear set (RS1).

11. A multi-speed transmission in planetary design for a vehicle, comprising:
    a housing (11);
    a first shaft (1) provided as a drive (An), and a second shaft (2) provided as an output (Ab) and arranged axially parallel to the drive (An);
    first, second, and third planetary gear sets (RS1, RS2, RS3);
    a plurality of additional shafts (3, 4, 5, 6, 7, 8, 9);
    six shifting elements (K1, K2, K3, K4, B1, B2), whereby actuation of the six shifting elements realizes several gears;
    a first machine element (ST1) and a second machine element (ST2) configured to transfer torque between the drive (An) and the output (Ab);
    the first shaft (1) connectable as the drive (An) to a planetary gear carrier (PT2) of the second planetary gear set (RS2), to a sun gear (SR1) of the first planetary gear set (RS1), to a ring gear (HR2) of the second planetary gear set (RS2), to a planetary gear carrier (PT1) of the first planetary gear set (RS1), and to the first machine element (ST1); and the second shaft (2), as the output (Ab), is connected or connectable to the first machine element (ST1) and to the second machine element (ST2);

wherein a ring gear (HR1) of the first planetary gear set (RS1) is directly connected through a seventh shaft (7) of the plurality of additional shafts to a planetary gear carrier (PT3) of the third planetary gear set (RS3); and wherein the first shaft (1) is connectable through a second shifting element (K2) of the six shifting elements, designed as a clutch, directly to the sun gear (SR1) of the first planetary gear set (RS1) and directly to the ring gear (HR2) of the second planetary gear set (RS2) through a fourth shaft (4) of the plurality of additional shafts; and wherein the several gears of the transmission comprise nine forward shifting gears (G1 to G9) and at least one reverse shifting gear (R).

12. The multi-speed transmission according to claim 11, wherein:

for shifting of a first forward gear (G1) of the nine forward shifting gears, a second shifting element (K2) and a fourth shifting element (K4) of the six shifting elements, both designed as clutches, and a fifth shifting element (B1) of the six shifting elements, designed as a brake, are locked;

for shifting of a second forward gear (G2) of the nine forward shifting gears, the fourth shifting element (K4), the fifth shifting element (B1), and a first shifting element (K1) of the six shifting elements, designed as a clutch, are locked;

for shifting of a third forward gear (G3) of the nine forward shifting gears, the first shifting element (K1), the second shifting element (K2), and the fourth shifting element (K4) are locked;

for shifting of a fifth forward gear (G5) of the nine forward shifting gears, the first shifting element (K1), the second shifting element (K2) and a third shifting element (K3) of the six shifting elements, designed as clutch, are locked;

for shifting of a sixth forward gear (G6) of the nine forward shifting gears, the first shifting element (K1), the third shifting element (K3), and the fifth shifting element (B1) are locked;

for shifting of a seventh forward gear (G7) of the nine forward shifting gears, the second shifting element (K2), the third shifting element (K3), and the fifth shifting element (B1) are locked;

for shifting of an eighth forward gear (G8) of the nine forward shifting gears, the third shifting element (K3), the fifth shifting element (B1) and a sixth shifting element (B2) of the six shifting elements, designed as a brake, are locked;

for shifting of a ninth forward gear (G9) of the nine forward shifting gears, the second shifting element (K2), the third shifting element (K3), and the sixth shifting element (B2) are locked; and for shifting of the reverse gear (R), the second shifting element (K2), the fourth shifting element (K4), and the sixth shifting element (B2) are locked.

13. The multi-speed transmission according to claim 11, wherein:

for shifting of a fourth forward gear-(G4) of the nine forward shifting gears, the second shifting element (K2), the fourth shifting element (K4), and the third shifting element (K3) are locked.

14. The multi-speed transmission according to claim 11, wherein:

for shifting of a fourth forward gear (M1) of the nine forward shifting gears, the third shifting element (K3), the fourth shifting element (K4), and the sixth shifting element (B2) are locked.

15. The multi-speed transmission according to claim 11, wherein:

for shifting of a fourth forward gear (M2) of the nine forward shifting gears, the first shifting element (K1), the third shifting element (K3), and the fourth shifting element (K4) are locked.

16. The multi-speed transmission according to claim 11, wherein:

for shifting of a fourth forward gear (M3) of the nine forward shifting gears, the third shifting element (K3), the fourth shifting element (K4), and the fifth shifting element (B1) are locked.

* * * * *